United States Patent
Odom et al.

(10) Patent No.: US 6,639,210 B2
(45) Date of Patent: Oct. 28, 2003

(54) GEOMETRICALLY OPTIMIZED FAST NEUTRON DETECTOR

(75) Inventors: Richard C. Odom, Benbrook, TX (US); Donald E. Tiller, Fort Worth, TX (US); Robert D. Wilson, Fort Worth, TX (US)

(73) Assignee: Computalog U.S.A., Inc., Fort Worth, TX (US)

( * ) Notice: Subject to any disclaimer, the term of this patent is extended or adjusted under 35 U.S.C. 154(b) by 41 days.

(21) Appl. No.: 09/805,798

(22) Filed: Mar. 14, 2001

(65) Prior Publication Data

US 2002/0130258 A1 Sep. 19, 2002

(51) Int. Cl.$^7$ ................................................ G01V 5/10
(52) U.S. Cl. ................ 250/269.6; 250/367; 250/390.11
(58) Field of Search ............................. 250/269.6, 367, 250/390.11

(56) References Cited

U.S. PATENT DOCUMENTS

| | | | | |
|---|---|---|---|---|
| 2,725,484 A | * | 11/1955 | McKee | 250/486.1 |
| 2,867,728 A | * | 1/1959 | Pollock | 376/118 |
| 3,707,631 A | * | 12/1972 | Untermyer | 250/363.01 |
| 3,869,608 A | * | 3/1975 | Scherbatskoy | 376/160 |
| 4,122,239 A | | 10/1978 | Riboulet et al. | |
| 4,122,339 A | | 10/1978 | Smith, Jr. et al. | |
| 4,122,340 A | | 10/1978 | Smith et al. | |
| 4,134,011 A | | 1/1979 | Smith et al. | |
| 4,152,590 A | | 5/1979 | Smith et al. | |
| 4,605,854 A | | 8/1986 | Smith, Jr. | |
| 4,631,405 A | | 12/1986 | Smith, Jr. | |
| 4,647,781 A | | 3/1987 | Takagi et al. | |
| 4,810,459 A | * | 3/1989 | Fontenot | 376/160 |
| 4,829,185 A | | 5/1989 | Cerff | |
| 4,883,956 A | | 11/1989 | Melcher et al. | |
| 4,958,080 A | | 9/1990 | Melcher et al. | |
| 5,008,067 A | | 4/1991 | Czirr | |
| 5,025,151 A | | 6/1991 | Melcher et al. | |
| 5,068,532 A | | 11/1991 | Wormwald | |
| 5,264,154 A | | 11/1993 | Akiyama et al. | |
| 5,300,770 A | | 4/1994 | Allen et al. | |
| 5,660,627 A | | 8/1997 | Manente et al. | |
| 5,767,510 A | * | 6/1998 | Evans | 250/269.1 |
| 6,011,266 A | | 1/2000 | Bell | |
| 6,140,651 A | * | 10/2000 | Justus et al. | 250/390.11 |
| 6,207,953 B1 | | 3/2001 | Wilson | |

FOREIGN PATENT DOCUMENTS

WO    WO 87/07733    12/1987

OTHER PUBLICATIONS

U.S. patent application Ser. No. 09/808,216, Odom et al., filed Mar. 14, 2001.
U.S. patent application Ser. No. 09/808,621, Odom et al., Mar. 14, 2001.
W.S. Emmerich, "A Fast Neutron Scintillator", Review of Scientific Instruments, vol. 25, pp 69–70, 1954.
J.B. Birks, "The Theory and Practice of Scintillation Counting", Pergamon Press, pp. 547–550, Oxford, 1964.

* cited by examiner

Primary Examiner—Constantine Hannaher
Assistant Examiner—Shun Lee
(74) Attorney, Agent, or Firm—Patrick H. McCollum

(57) ABSTRACT

An improved fast neutron detector fabricated with alternating layers of hydrogenous, optically transparent, non scintillating material and scintillating material. Fast neutrons interact with the hydrogenous material generating recoil protons. The recoil protons enter the scintillating material resulting in scintillations. The detector is optically coupled to a photomultiplier tube which generates electrical pulses proportional in amplitude to the intensity of the scintillations, and therefore are an indication of the energy of the fast neutrons impinging upon the detector. Alternating layers of materials are dimensioned to optimize total efficiency of the detector, or to optimize the spectroscopy efficiency of the detector. The scintillating material is preferably ZnS, and the hydrogenous material is preferably plastic. The detector is ideally suited for well logging applications and fast neutron monitor applications.

25 Claims, 7 Drawing Sheets

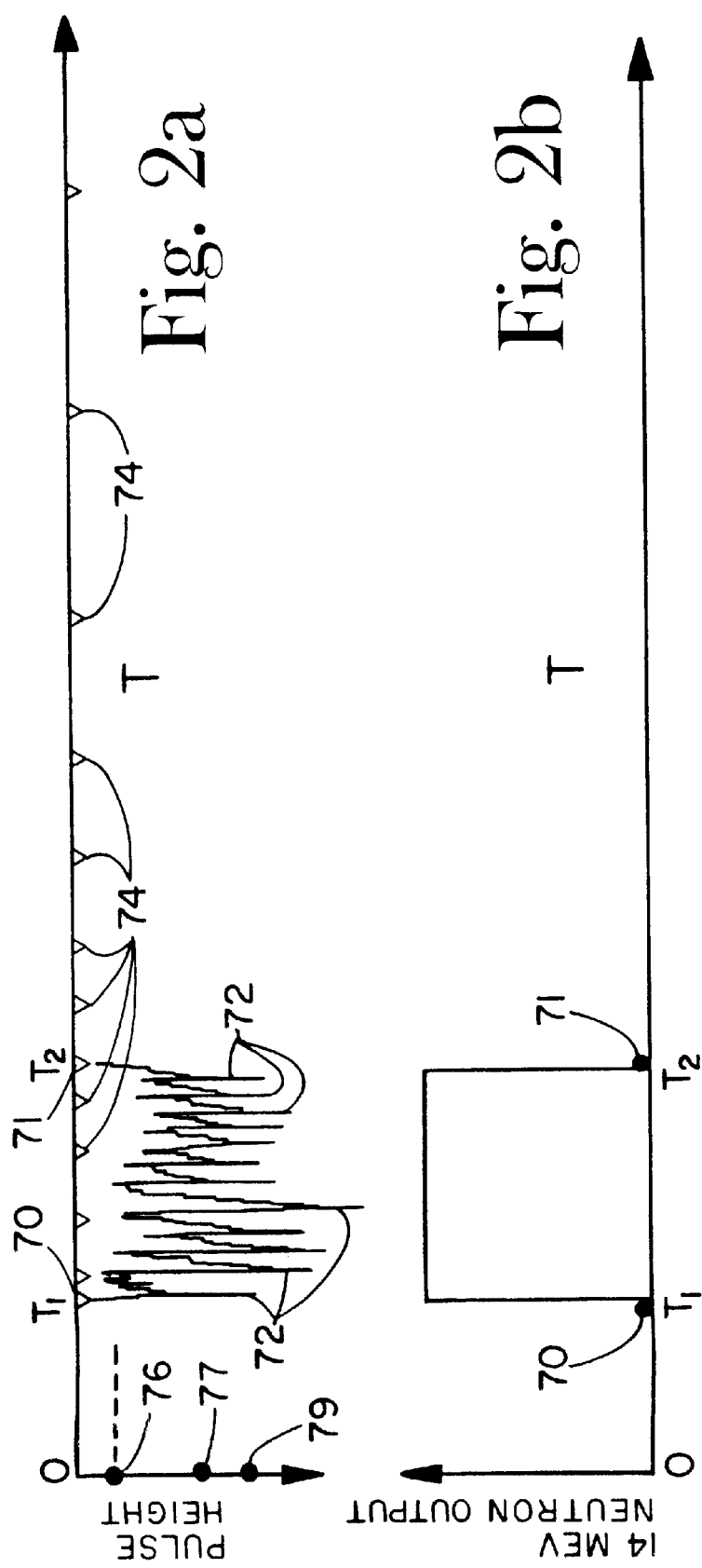

Fig. 4a
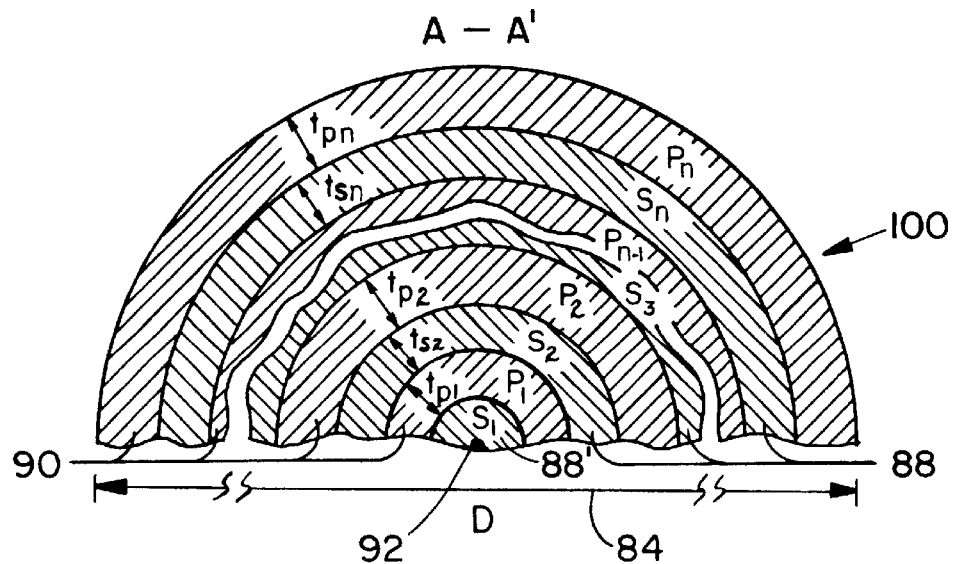
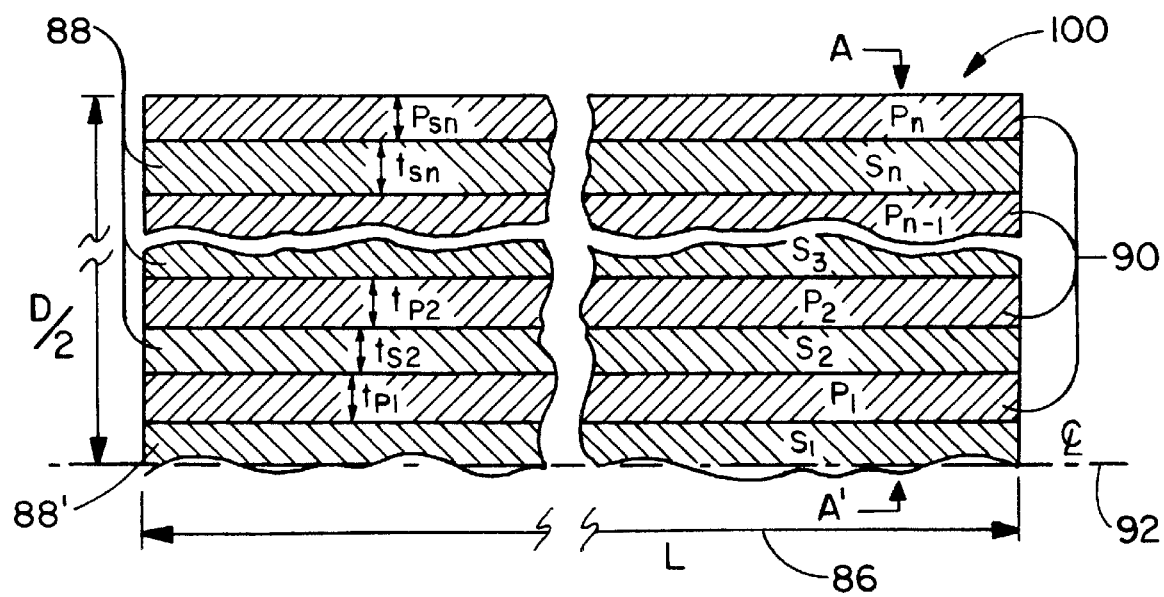
Fig. 4b

GEOMETRICALLY OPTIMIZED FAST NEUTRON DETECTOR

RELATED APPLICATIONS

This application is related to application Ser. No. 09/808,216 entitled "Geometrically Optimized Fast Neutron Detector" and application Ser. No. 09/808,621 entitled "Geometrically Optimized Fast Neutron Detector."

BACKGROUND OF THE INVENTION

1. Field of the Invention

This invention is directed toward an improved fast neutron detector, and more particularly directed toward the optimization of the detector efficiency when used in logging of earth formations penetrated by a borehole and for a variety of applications.

2. Background of the Art

In the context of this disclosure, "logging" is defined as the measure of a parameter of material penetrated by a borehole, as a function of depth within the borehole.

There are many types or classes of borehole logging systems. These classes include, but are not limited to, electromagnetic, acoustic and nuclear systems. Each class of logging system typically comprises a "source" which emits energy into the surrounding formation, and one or more "detectors" which measure energy returning from the formation. Detector responses, when properly analyzed and processed, yield formation and borehole parameters of interest.

Any type or class of logging system typically comprises a source and detector system with sufficient depth of investigation to penetrate the logging instrument housing, penetrate the immediate borehole region, enter the surrounding earth formation, interact with the formation, and induce some type of response which returns to the borehole and the logging instrument to be detected and analyzed. Nuclear logging systems typically involve the use and measure of gamma radiation and neutron radiation. These types of beta particles. As a result, nuclear logging instruments typically comprises a source of neutrons, or a source of gamma radiation, one or more neutron detectors, or one or more gamma ray detectors, or some combination of these different types of sources and detectors.

Logging instruments are typically conveyed along a borehole by means of a wireline of drill string thereby creating a "log" of formation parameters as a function of depth within the borehole. Borehole conditions are harsh in that temperatures and pressures are high. Components within a logging instrument, such as detectors, are subjected to these environmental conditions well as vibration and impacts resulting from the conveying of the instrument along the borehole. As an example, nuclear detectors used in logging application must be able to withstand these harsh conditions of the borehole environment including temperatures which can reach 175 degrees Centigrade (°C.) or higher.

All nuclear logging systems involve the measure of statistical nuclear processes. As a result, statistical significance of the measurements is of prime importance since it directly affects the statistical precision of one or more parameters of interest computed from the measurement. Statistical precision improves as the number of detector events increases. It is therefore very desirable to maximize the efficiency of nuclear detectors used in borehole logging operations. Further, space is often limited in downhole instrumentation making it of utmost importance to maximize detector efficiency for a given geometry allowed in the design of the instrument.

Attention will now be directed toward prior art neutron detectors. Liquid scintillators have been used to detect high energy or "fast" neutrons. These scintillators also respond to impinging gamma radiation. Neutron and gamma ray "events" generate different pulse shape responses from liquid scintillators. Pulse shape discrimination methods therefore provide means for separating fast neutron and gamma ray induced responses in liquid scintillator detectors. Fast neutron and gamma ray measurements can be made with a single liquid scintillator detector. Liquid scintillators are relatively efficient. Unfortunately, liquid scintillators consist of flammable mixtures, and some mixtures have very low flash points. For these reasons, liquid scintillators are not desirable for high temperature, high pressure downhole applications.

Gas filled detectors, such as detectors containing relatively high pressures of helium-4 ($^4$He), have been used as fast neutron detectors. These detectors are relatively rugged, and can withstand relatively high temperatures encountered within the borehole. Because the detectors are gas filled rather than liquid or solid, their detection efficiency is relatively low, and therefore not particularly desirable for downhole applications where statistical significance of measured detector response is of prime importance.

Plastic scintillators are relatively efficient neutron detectors, rugged in construction, and able to operate at temperatures of at least 175° C. These detectors are, however, responsive to both fast neutrons and gamma radiation. Neutron and gamma ray events can not be delineated by the shape or amplitude of pulses produced by the detector. The crystal anthracene, a hydrocarbon, is another type of solid material used in fast neutron detectors but, like the plastics, can not separate fast neutron from gamma ray events using pulse shape or pulse amplitude discrimination.

Stilbene and p-terphenyl crystals are fast neutron detectors and are reported to produce pulses which can be separated into fast neutron and gamma ray events. This class of detector does not have the flammability of the liquid scintillators. The crystals are, however, not rated as operable at temperatures of 175° C. The crystals are also difficult to fabricate, and availability is questionable with the only known source being Russia.

A fast neutron detector potentially suitable for downhole applications is an activated zinc sulfide scintillator combined with a nonscintillating plastic. The activated dopant is preferably silver (Ag) but other elements, such as copper (Cu) may be suitable or even better activators depending on the application of the detector. Activated zinc sulfide will be denoted by the symbol "ZnS" in the remainder of this disclosure, with the understanding that the dopant can consist of a variety of materials. The non scintillating plastic can be any hydrogen rich material that is optically transparent and that possesses suitable mechanical properties.

Geometrically, the detector is constructed with a ZnS cylindrical core surrounded by alternating and concentric cylinders of plastic and ZnS. The scintillator detector was first introduced by Emmerich in 1954 (W. S. Emmerich., *Review of Scientific Instruments*, vol. 25, page 69 (1954)). Neutron and gamma ray events can be separated by pulse amplitude discrimination. Fast neutron detectors of this type are offered commercially by the Bicron division of Saint-Gobain International Ceramics, Inc. The material in not flammable, and it is thought that the detector can meet a 175° C. temperature rating with some modifications. The main disadvantage of this type of detector for borehole applications is the relatively small volume, with corresponding reduction in detector efficiency. Furthermore, efficiency is not maximized for specified detector volumes, and in particular for specified detector geometry of diameter D and length L. Detector volume is restricted by the lack of light transparency of ZnS, with scintillations within the ZnS element only being able to reach an optically coupled photomultiplier (PM) tube through the transparent plastic component of the detector. The plastic component of the detector contains hydrogen (H). As with other H containing fast neutron detectors, the material responds to fast neutrons impinging upon the detector by the proton recoil process, with recoil protons generating scintillations within the ZnS component of the detector. Detector response is further enhanced by a threshold (n,p) reaction with $^{32}S$ as reported by Birks (J. B. Birks, *The Theory and Practice of Scintillation Counting*, Pergamon Press, page 548, Oxford, 1964). This reaction introduces additional neutron induced proton flux within the ZnS scintillation material thereby increasing the efficiency of the detector.

Measures of fast neutrons are used in many prior art well logging systems to determine formation and borehole parameters of interest. In these prior art systems, fast neutron fluxes are typically measured inefficiently, and in many cases are determined indirectly in that the other parameters are measured and used to compute fast neutron fluxes.

The prior art contains patents teaching various apparatus and method for measuring and applying neutron and gamma ray measurements to obtain parameters of earth formations penetrated by a borehole. Patents thought to be the most relevant to this disclosure are summarized as follows:

U.S. Pat. No. 4,122,339 to Harry D. Smith, Jr. et al discloses a logging system that irradiates, with fast neutrons, earth formations penetrated by a borehole. Fast neutron population is measured indirectly from inelastic scatter gamma radiation detected with a gamma ray detector during bursts of fast neutrons from a pulsed neutron source. An epithermal neutron detector is used to measure epithermal neutron population following each neutron burst. The inelastic scatter gamma ray measurement is then combined with a fast neutron/epithermal neutron ratio to determine formation porosity.

U.S. Pat. No. 4,122,340 to Harry D. Smith, Jr. et al discloses a logging system using epithermal and fast neutron detectors. A stilbene scintillation crystal is used to detect fast neutrons. Measurements of fast and epithermal neutrons are combined to determine formation porosity.

U.S. Pat. No. 4,134,011 to Harry D. Smith, Jr. et al discloses a logging system comprising one epithermal and one fast neutron detector. Formation porosity is determined by making a dual spaced fast to epithermal neutron measurement using a continuous source of fast neutrons. Stilbene is used in the fast neutron detector with a spacing from the neutron source of 40 to 80 centimeters (cm). Pulse shape discrimination is used to separate gamma ray events from fast neutron events.

U.S. Pat. No. 4,152,590 to Harry D. Smith, Jr. et al discloses a logging system which is very similar to the system disclosed in U.S. Pat. No. 4,134,011 summarized above. A thermal decay rate measurement is added.

U.S. Pat. No. 4,605,854 to Harry D. Smith, Jr. disclosed a logging system wherein earth formation is irradiated with fast neutrons. A single fast neutron detector is used to measure a resulting neutron energy spectrum by an unfolding process. The patent does not disclose specific detector type, and whether or not gamma ray discrimination is achieved.

U.S. Pat. No. 4,631,405 to Harry D. Smith, Jr. discloses a dual spaced fast/epithermal neutron porosity logging system. Fast neutrons are measured at a short spacing with respect to a fast neutron source, and epithermal neutrons are measured at a long spacing with respect to the neutron source. Measurements are combined to obtain formation porosity.

U.S. Pat. No. 5,068,532 to Malcolm R. Wormald et al discloses a system wherein fast neutrons are detected for the purpose of providing coincident-timing information in lieu of using a pulsed neutron source. The detector is not used to produce borehole logging information, although logging is mentioned in one application.

U.S. Pat. No. 5,008,067 to John B. Czirr discloses a method for monitoring the output of fast neutrons from a neutron source element of a well logging apparatus. The detector comprises a scintillator containing oxygen. The $^{16}O(n,p)^{16}N$ reaction induced by 14 MeV neutrons produces delayed and very large amplitude pulses resulting from the sum of detected beta-decay energy and the 6–7 MeV gamma radiation from the decay of $^{16}N$. These pulses can be separated from other neutron and gamma ray pulses.

U.S. Pat. No. 6,207,953, assigned to the assignee of the present application, discloses a logging system in which fast neutrons and inelastic scatter gamma rays are measured and combined to determine formation porosity (and therefore density), and also combined to determine formation liquid saturation. A liquid scintillator is identified for fast neutron detection, providing both fast neutron and inelastic gamma ray counts by pulse shape discrimination. An alternate plastic scintillator and gamma ray detector combination is also taught in the event that a liquid scintillator is not suitable for a particular application. Fast neutron energies are distinguished by use of pulse height discrimination to provide borehole size compensation for air filled boreholes.

In view of the above discussion of prior art, it is apparent that an improved detector for directly measuring fast neutron fluxes in harsh borehole environments is needed. Furthermore, it is apparent that a fast neutron detector with efficiency maximized for a given detector geometry is also needed. This disclosure addresses both of these needs.

SUMMARY OF THE INVENTION

A geometrically optimized fast neutron detector is fabricated of alternating regions of non scintillating, hydrogenous, optically transparent material and scintillation material. The interfaces between alternating regions are critical to the detector's fast neutron response. One geometry comprises alternating, concentric, right cylinders of activated ZnS scintillator material and non scintillating plastic. The ZnS activator can be Ag or Cu or any other suitable activator. Again, the symbol ZnS is used to denote activated zinc sulfide, which can be activated with a variety of dopants. The detector, however, is not limited to cylindrical geometry and may utilize alternate types of scintillator material. The plastic denotes a material that is rich in hydrogen (H) and that is optically transparent. Fast neutrons interact with the plastic producing recoil protons which enter the ZnS scintillation material. The ZnS material is normally potted with a binder such as epoxy, which also contains H. Therefore, some proton recoils will also occur within the ZnS scintillator region. Protons create scintillations within the ZnS, and a portion of this light escapes the ZnS, enters the transparent plastic, and is detected by a photomultiplier (PM) tube which is optically coupled to the detector. The PM dynode string is electrically connected to pulse amplification circuitry. Recoil proton energy is a function of fast neutron energy impinging upon the plastic component of the detector. The intensity of the scintillation is a function the energy of recoil protons entering the ZnS scintillation material. The amplitude of the pulse from the amplification circuitry of the PM tube is a function of the intensity of the scintillation. The number of output pulses is a measure of fast neutron flux, and the amplitude of the pulses is a measure of fast neutron energy. Pulse amplitude is also affected by the position at which the proton recoil reaction occurs within the plastic material. This effect must be considered in using the detector in fast neutron spectrometry systems, as will be discussed in more detail in a subsequent section of this disclosure.

Recoil protons have a limited range within the plastic materials. Only proton recoil events occurring near a plastic-ZnS interface will enter the scintillation material and therefore create a scintillation. ZnS is not light transparent. As a result, only proton scintillation events occurring near a ZnS-plastic interface enter a transparent plastic cylindrical annuli, and are eventually detected by the PM tube and recorded as a fast neutron event.

There is also evidence that additional proton flux is generated within the ZnS scintillation material by fast neutrons through the $^{32}S(n,p)^{32}P$ reaction. These protons also create scintillations within the ZnS material.

For a given overall detector diameter D, efficiency can generally be increased by decreasing the radial wall thickness of the ZnS and plastic cylinders, thereby increasing the ZnS-plastic surface area. If, however, the wall thickness of the plastic cylinders is decreased too much, the cylinders cease to become an efficient source of recoil protons, and further cease to become a scintillation "light path" to the PM photocathode. Furthermore, if the radial wall thickness of the ZnS cylinders is decreased too much, the cylinders will not scintillate all entering recoil protons. Stated another way, the ZnS and plastic cylinder wall thicknesses for maximum detector efficiency is a "trade-off", and these dimensions must be optimized for a given detector diameter D. Detector efficiency can also be increased by increasing the length L of the detector. Length is also a trade-off parameter in that excessive length can decrease the detector's gamma ray rejection capability, and further decrease the efficiency of the plastic annuli as light paths to the PM photocathode.

The geometrically optimized ZnS/plastic fast neutron detector is ideally suited for use in any downhole instrument in which a measure of fast neutrons is desired. One application is disclosed in the previously referenced U.S. Pat. No. 6,207,953, assigned to the assignee of the present application, and hereby incorporated in this disclosure by reference. The logging system uses measures of fast neutrons and inelastic scatter gamma rays, which are combined to determine formation porosity (and therefore density), and also combined to determine formation liquid saturation. A pulsed neutron generator provides a source of fast neutrons. Sodium iodide is a suitable inelastic gamma ray detector, wherein the detector is wrapped with a thermal neutron absorbing material such as cadmium to prevent neutron activation of the crystal. A ZnS/plastic detector is used to measure fast neutrons, wherein the geometry of the detector is optimized for maximum efficiency for the space available for the detector within the instrument or logging "tool". A ratio of fast neutron energies is determined by use of pulse height discrimination to provide borehole size compensation for air filled boreholes. As mentioned previously, both impinging fast neutron energy and the position at which a neutron induced proton recoil event occurs within the plastic component of the detector affect measured pulse amplitude. It is necessary to account for proton energy loss, commonly referred to as "dE/dx", as the proton moves from the plastic component into the scintillation component, as will be discussed subsequently.

The geometrically optimized detector is suited for use as a monitor of output from fast neutron sources. This application is not only applicable to well logging apparatus and methods, but also applicable to a wide range of analytical and testing methods and apparatus which use fast neutron sources.

BRIEF DESCRIPTION OF THE DRAWINGS

So that the manner in which the above recited features, advantages and objects of the present invention are attained can be understood in detail, a more particular description of the invention, briefly summarized above, may be had by reference to the embodiments thereof which are illustrated in the appended drawings. It is to be noted, however, that the appended drawings illustrate only typical embodiments of the invention and are therefore not to be considered limiting of its scope, for the invention may admit to other equally effective embodiments.

FIG. 2a is a plot of pulse height from a ZnS/plastic fast neutron detector as a function of time, wherein the pulses are induced by reactions from a pulse of 14 MeV neutrons;

FIG. 2b is a plot of 14 MeV neutron output from a neutron generator as a function of time;

FIG. 4a is a cross sectional view of a concentric, coaxial, geometrically optimized ZnS/plastic fast neutron detector;

FIG. 4b is a side sectional view of a concentric, coaxial, geometrically optimized ZnS/plastic fast neutron detector;

DETAILED DESCRIPTION OF THE PREFERRED EMBODIMENTS

A fast neutron detector suitable for use in borehole logging instruments must detect neutrons efficiently in the energy ranges from about 1 million electron volts (MeV) to 14 MeV, reject any response to accompanying radiation, be mechanically rugged, and operate at a temperature of about 175° C. The combination of separate regions of activated ZnS scintillator and hydrogen rich plastic produces a suitable fast neutron detector when optically coupled to a photomultiplier (PM) tube. Energetic protons are produced by fast neutrons scattering from hydrogen within the plastic. A scintillation photon is produced when an energetic proton reaches the ZnS scintillator. Because the linear range of energetic protons is very short in both the scintillator and plastic materials, and because light must escape the optically cloudy ZnS region to be detected by the PM tube, the interface between the two materials is critical to the detector's fast neutron response. Therefore, the total surface area of the ZnS-plastic interface is an important design consideration. Other important design considerations are the volume of the detector, the detector diameter and length, the geometric shapes of the regions of scintillator and plastic material, the operating temperature that should be at least 175° C., and the manufacturability of the most efficient geometric configuration of the detector.

Detectors consisting of a combination of ZnS and plastic regions have shown excellent gamma radiation rejection on the basis of pulse height. That is, the PM tube pulses produced by fast neutrons in the desired energy range are much larger in amplitude than pulses induced by gamma radiation with similar energy.

As will be illustrated in a subsequent section of this disclosure, gamma ray induced pulses are sufficiently small in amplitude so that a discriminator circuit can be set to reject gamma ray pulses with little loss in fast neutron response. ZnS alone has a measurable fast neutron response. However, when used alone, ZnS is restricted to relatively small volumes due to lack of light transparency and the resulting inability of scintillation photons occurring within the material to reach the photocathode of an optically coupled photomultiplier (PM) tube. Larger volume, more efficient scintillation detectors can be obtained by combining ZnS with a nonscintillating, optically transparent hydrogen rich plastic. The plastic produces additional fast neutron response and provides an optical path for scintillation photons to the photocathode of the optically coupled PM tube.

It should be understood that various scintillation materials can be used in combination with the plastic component. As an example, the zinc sulfide dopant can be Ag or Cu depending upon temperature requirements, physical geometry constraints, and even economic limitations. The plastic could be replaced with another hydrogen rich and optically transparent material, such as RTV.

Prior Art Detectors

Figure 1A:
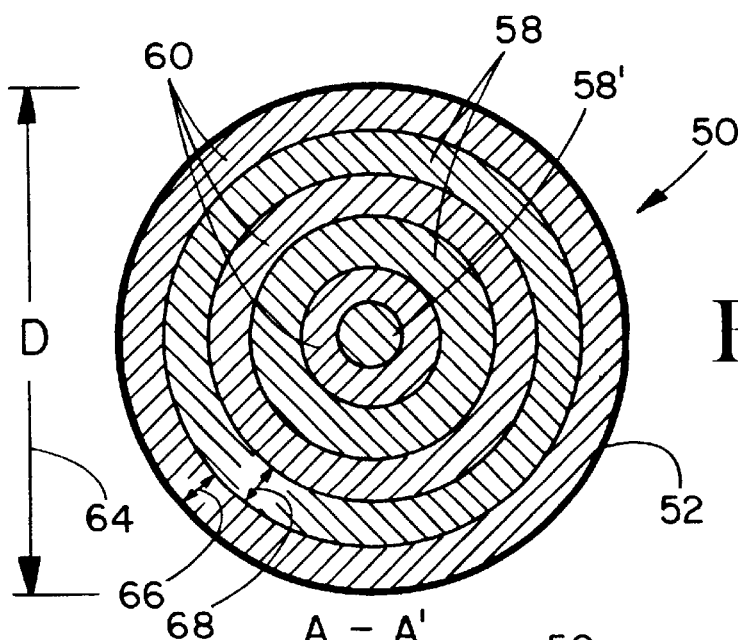
FIG. 1a is a cross sectional view of a prior art ZnS/plastic fast neutron detector.
Figure 1B:
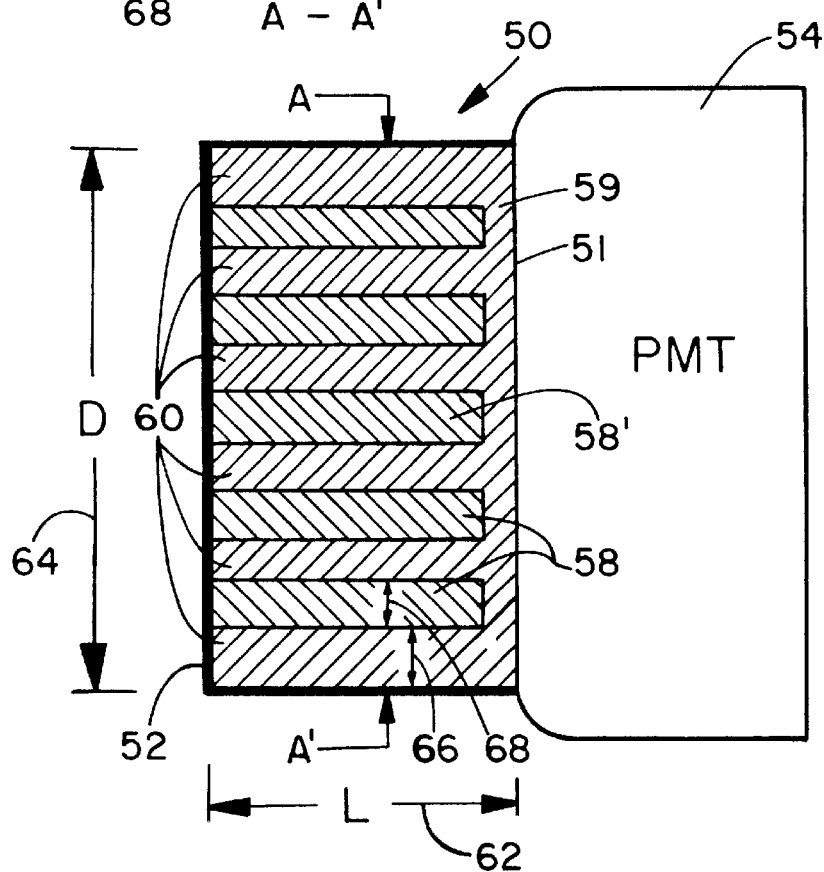
FIG. 1b is a side sectional view of a prior art ZnS/plastic fast neutron detector.

A prior art detector is shown as a cross sectional view in FIG. 1a and as a side sectional view in FIG. 1b. The detector is identified as a whole by the numeral 50. Geometrically, the detector is constructed with a ZnS cylindrical core or "bulls eye" 58' surrounded by alternating and concentric cylinders 60 of plastic and cylinders 58 of ZnS. The core 58' and alternating concentric cylinders 58 and 60 are bound together as a unit preferably by epoxy and enclosed at one end and around the periphery within a an opaque cover 52. The second, uncovered end is optically coupled at interface 51 to a PM tube 54 as best seen in FIG. 1b.

Detectors of the type and geometry shown in FIGS. 1a and 1b are made commercially by the Bicron division of Saint-Gobain International Ceramics, Inc. More specifically, the Bicron model BC-720 scintillator's length "L" dimension 62 is 0.625 inches (in.) or 15.88 millimeters (mm), and the diameter "D" dimension 64 1.5 inches (in.) or 38.1 millimeters (mm). Other diameters are currently available, but only with a length of 0.625 in. There are two concentric ZnS cylinders and three plastic cylinders 60 arranged alternately around the ZnS core 58'. All components of the scintillator are potted in epoxy. The wall thicknesses 66 and 68 of all plastic cylinders 60 and ZnS cylinders 58 are both 0.125 in. (3.175 mm) in the model BC-720 scintillator. The plastic is milled with concentric recesses. A bottom base plate 59 contacts the PM tube 54 at the interface 59. The concentric cylinders 58 of ZnS are fitted into the concentric recesses with an epoxy mixture.

Principles of Operation

As mentioned previously, the ZnS/plastic detector assembly responds through the mechanism of fast neutrons interacting with hydrogen within the plastic cylinders to produce recoil protons. Recoil protons enter the ZnS cylinders. Protons create scintillations within the ZnS cylinders. A portion of light produced by the scintillations escapes the ZnS and enters the transparent plastic cylinders and is subsequently detected by a photomultiplier (PM) tube that is optically coupled to the detector. The PM photocathode is electrically connected through a dynode string to pulse amplification circuitry. Recoil proton energy is a function of fast neutron energy impinging upon the plastic component of the detector. The intensity of the scintillation is a function of the energy of recoil protons entering the ZnS scintillation material and also depends on the dE/dx of protons within the plastic. The amplitude of the pulse from the amplification circuitry of the PM tube is a function of the intensity of the scintillation. The number of output pulses is a measure of fast neutron flux, and the amplitude of the pulses is a measure of fast neutron energy.

FIGS. 2a and 2b illustrate the response of the fast neutron detector resulting from irradiating earth formation or other material with several bursts or "pulses" of fast (14 MeV) neutrons. The response shown is a superposition of many such bursts.

FIG. 2b is a plot of neutron output (ordinate) from a fast neutron source as a function of time T (abscissa). The burst is initiated at a time $T_1$ as indicated by the point 70 on the time axis, and terminated at a time $T_2$ as indicated by the point 71 on the time axis.

FIG. 2a shows the corresponding output from the photomultiplier tube and amplification circuit of the detector assembly. Pulse height or amplitude (ordinate) is plotted as a function of time T (abscissa). Prior to the burst initiation at $T_1$ there are essentially no output pulses. Once the burst is initiated at $T_1$, relatively high amplitude pulses 72 are observed as a result of recoil protons inducing scintillations within the ZnS component of the detector. The pulse amplitude is a function of recoil proton energy which, in turn, is a function of fast neutron energy impinging upon the detector. The number of high amplitude pulses is a function of the intensity of fast neutron flux impinging upon the detector. High amplitude pulses cease to be observed at time $T_2$ when the neutron burst is terminated. Smaller pulses 74 are also observed during and after termination of the neutron burst. These result primarily from gamma radiation produced by the capture of thermal neutrons after the burst. It is apparent that this gamma radiation generates pulses 74 of a much lower amplitude than pulses generated by the fast neutron-recoil proton process. By setting a discriminator level at a pulse height in excess of the amplitude for gamma radiation, for example 76, and recording pulses of amplitude greater than this level, gamma radiation can be effectively removed from the detector response. The detector then responds only to fast neutrons over the range of about 0.5 to 14 MeV. The detector also exhibits noise, which is lower in amplitude than the neutron induced pulses 72. Noise related pulses are not shown in FIG. 2a for purposes of clarity.

As stated previously, there is also evidence that additional proton flux is generated within the ZnS scintillation material by fast neutrons through the $^{32}S(n,p)^{32}P$ reaction. These protons also create scintillations within the ZnS material. Proton recoils may also be produced in the scintillation material if the ZnS binder contains H.

Geometric Optimization of Detector Efficiency

The process of optimizing the ZnS-plastic combination for the detection of fast neutrons is presented by way of example. The example uses the geometry of the prior art detector, consisting of alternating concentric cylinders of ZnS and plastic. This geometry is shown in FIGS. 1a and 1b.

Recoil protons have a limited range within the plastic material. Only proton recoil events occurring near a ZnS-plastic interface will enter the scintillation material and therefore create a scintillation. As a specific example, consider the use of an acrylic resin such as Lucite for the plastic cylinder components of the detector. Lucite meets the requirements of being a hydrogen rich source of recoil protons, is optically transparent, and is suitable for moderate temperatures encountered within a borehole environment. The range of a 5 MeV proton is 0.04 grams per square centimeter ($g/cm^2$). For the density of 1.19 grams per cubic centimeter ($g/cm^3$) for Lucite, the linear range of the 5 MeV proton is only 0.033 cm. Recall that the wall thickness of all of the plastic cylinders of the Bicron model BC-720 scintillator assembly is 0.3175 cm. It is apparent, therefore, that a large portion of recoil protons created by fast neutron reactions in the interior of the plastic cylinders have insufficient linear range to reach the nearest ZnS scintillator, create a scintillation, and therefore be detected. Stated another way, excess plastic cylinder thickness decreases the overall efficiency of the detector assembly to fast neutrons for a given diameter D. Efficiency can be optimized by varying the plastic cylinder wall thickness and varying the number of cylinders, but for a given overall detector diameter D.

ZnS is not light transparent. As a result, only proton scintillation events occurring near a ZnS-plastic interface enter a transparent plastic cylinder and are subsequently detected by the PM tube and recorded as a fast neutron event. As in the case of the plastic cylinders, excess ZnS cylinder wall thickness can decrease the overall efficiency of the detector to fast neutrons, and efficiency can be optimized by optimizing ZnS cylinder wall thickness by using more but thinner cylinders for a given overall detector diameter D.

There are, however, "opposing" factors that affect detector optimization. Recall that the plastic cylinders serve not only as a source of hydrogen for the proton recoil reaction, but also serve as light paths through which scintillations pass from the detector assembly to the optically coupled PM tube. If the wall thickness of the plastic cylinders is reduced excessively, the transmission of scintillation light is impaired.

Length of the detector can also be increased to conceptually increase detector efficiency. Applications of the detector may limit the length. In addition, increasing length L can also increase the ratio of gamma radiation pulse amplitude to the proton recoil pulse amplitude thereby making the rejection of gamma radiation events by pulse height discrimination more difficult. Once again, increasing efficiency by this technique presents a trade-off.

As mentioned previously, the dE/dx effect of proton transport through the plastic must be considered if the detector is to be used as a fast neutron spectrometer. Conceptually, average dE/dx is reduced as the thickness 66 of the plastic cylinders are decreased. This may result in additional alternating cylinders of plastic and ZnS for a given detector diameter D. Such an optimization for spectroscopy reasons might decrease the overall efficiency of the detector. Stated another way, if the detector is to be used as a fast neutron spectrometer, optimization must include both efficiency and spectroscopy considerations.

There is also evidence that additional proton flux is generated within the ZnS scintillation material by fast neutrons through the $^{32}S(n,p)^{32}P$ reaction. These protons also create scintillations within the ZnS material, and the wall thickness of the cylinders determines the portion of scintillation reaching the plastic cylinder light paths.

Figure 3A:
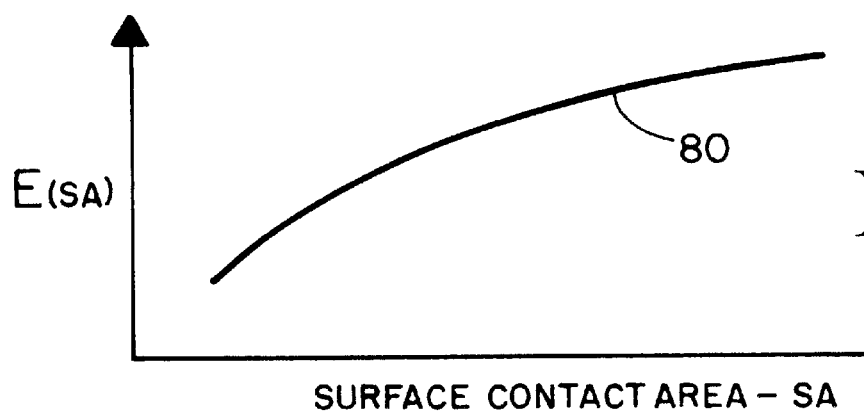
FIG. 3a is a conceptual illustration of the effects of ZnS-plastic surface contact area upon the efficiency of a ZnS/plastic fast neutron detector.
Figure 3B:
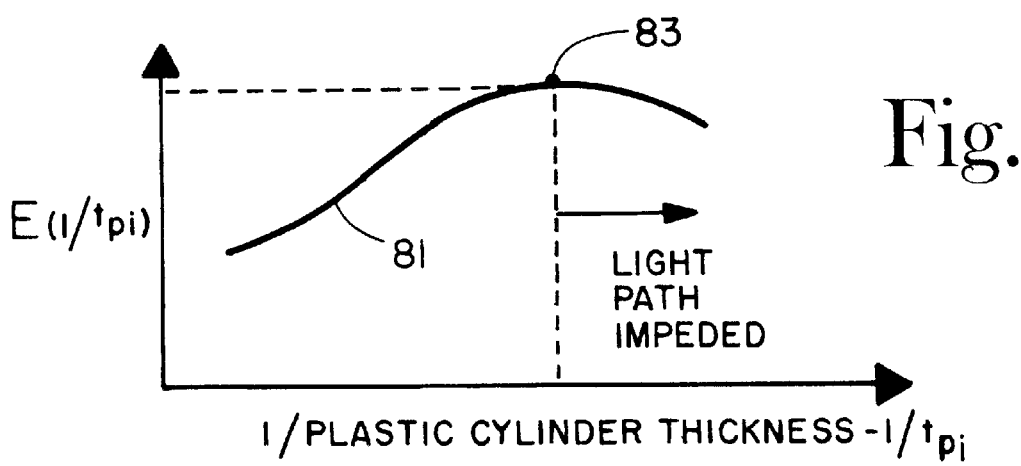
FIG. 3b is a conceptual illustration of the effects of wall thickness of alternating, concentric plastic cylinders upon the efficiency of a ZnS/plastic fast neutron detector.
Figure 3C:
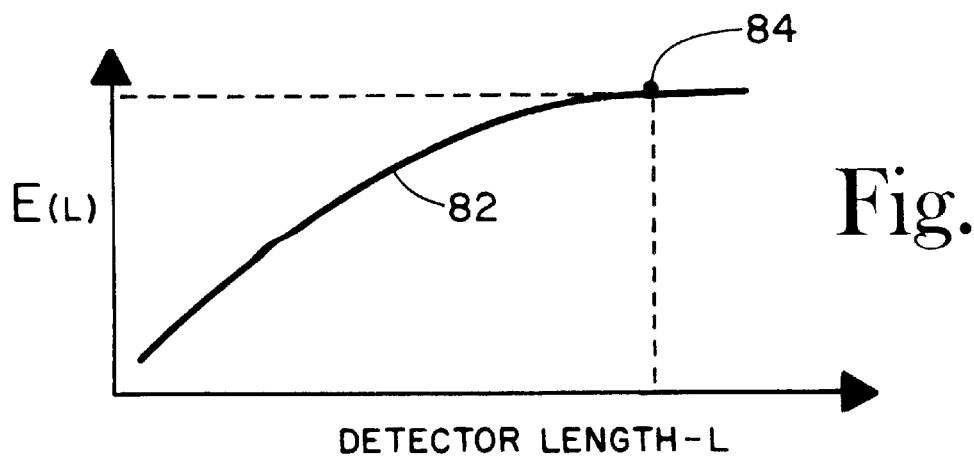
FIG. 3c is a conceptual illustration of the effects of detector length upon the efficiency of a ZnS/plastic fast neutron detector.

The factors governing geometric optimization of a ZnS/plastic scintillator of given diameter D and length L are shown conceptually in FIGS. 3a, 3b and 3c.

FIG. 3a is a plot of an efficiency term E(SA) as a function of surface contact area SA between the ZnS and plastic cylinders. This contact area is, of course, governed by the number n of alternating ZnS and plastic cylinders. For a given diameter D, SA is a function of the thickness tsi of the ZnS cylinders, where (i=1, . . . , n). For reasons discussed above, E(SA) increases with increasing SA as is illustrated by the curve 80.

FIG. 3b is a plot of an efficiency term $E(1/t_{pi})$ as a function of the inverse of plastic cylinder wall thickness $t_{pi}$, where again (i=1, . . . , n). For a given value of D and for reasons discussed above, $E(1/t_{pi})$ varies as a function of $1/t_{pi}$ as is illustrated by the curve 81. $E(1/t_{pi})$ increases as a function of $1/t_{pi}$ to a certain value 83, and then starts to decrease as increasingly thin plastic cylinder walls impede the passage of scintillation light to the PM tube.54 (see FIG. 1b).

FIG. 3c is a plot of an efficiency term E(L) as a function of detector length L. For a given value of D, E(L) increases as a function of L for reasons discussed above as is illustrated by curve 82. At some value of L, further increase in length does not increase E(L) since scintillation light, formed in a portion of the detector opposite the PM tube, can not reach the PM tube and there be sensed. This point is conceptually illustrated at 84.

The total detector efficiency, $E_{total}$, for a given detector diameter D, can be expressed mathematically as $$E_{total} = f(E(SA), E(1/t_{pi}), E(L), E(A_\gamma)) \tag{1}$$

where $f(E(SA), E(1/t_{pi}), E(L), E(A_\gamma))$ is a function containing the efficiency terms E(SA), $E(1/t_{pi})$, and E(L). $E(A_\gamma)$ is an efficiency term which accounts for the relative amplitude of gamma ray induced pulses as a function of detector length. For a given detector diameter D, which is usually determined by the physical application of the detector in an instrument such as a logging tool, the parameters ZnS cylinder wall thickness tsi (and thus SA), plastic cylinder wall thickness (and thus$1/t_{pi}$), and length L are adjusted to maximize the total counter efficiency $E_{total}$. If the physical application also restricts the length L, then only the first two parameters are adjusted to maximize $E_{total}$. $E(A_\gamma)$ is not an adjustable term. The efficiency of a ZnS/plastic detector can, therefore, be customized for a given physical dimension to geometrically optimize the detection efficiency for fast neutrons.

The detector can also be optimized for fast spectroscopy applications by minimizing the previously discussed dE/dx energy loss of recoil protons within the plastic component of the detector. Another efficiency term E(dE/dx) expresses the functional dependency of the energy loss dE/dx. The detector efficiency for fast neutron spectroscopy, Espec, for a given detector diameter D, can be expressed mathematically as $$E_{spec} = f(E(SA), E(1/t_{pi}), E(L), E(A_y), E(dE/dx)) \quad (2)$$

The efficiency terms E(SA), E(1/$t_{pi}$), E(L) and E(dE/dx) are adjusted to maximize $E_{spec}$. It should be noted that E(dE/dx) is also a function of the plastic thickness tpi for reasons discussed above.

FIGS. 4a and 4b illustrate end and side sectional views, respectively, of a geometrically optimized ZnS/plastic fast neutron detector 100 comprising n pairs of ZnS and plastic cylinders. The axial center line of the detector is identified by the numeral 92. The ZnS cylinders 88 are denoted as $s_i$ (i=1. . . . , n) starting with the core cylinder 88' as $s_1$. The alternating plastic cylinders are denoted as $p_i$ (i=1. . . . , n). Cylinder wall thicknesses for the ZnS cylinders 88 and plastic cylinders 90 are identified as $t_{si}$ and $t_{pi}$, respectively, where (i=1, . . . , n). It should be noted that cylinder wall thicknesses need not be equal. That is, it is not necessary for $t_{pj}$ to equal $t_{pj+1}$, or $t_{sj}$ to equal $t_{sj+1}$, or $t_{pj}$ to equal $t_{pj}$, where 1<j<n. As an example, it might be advantageous to fabricate a detector where $t_{si} < t_{pi}$ for any or all values of i=1 . . . n. Cylinder thicknesses can be adjusted in any manner to maximize the total efficiency $E_{total}$, or the spectroscopy efficiency $E_{spec}$, as long as the constraints on D (identified as dimension 84) and L (identified as 86) of the detector 100 are satisfied.

The detector is encapsulated within a light-tight housing (not shown) with the exception of the end that is optically coupled to the PM tube.

It should be noted that materials used in a geometrically optimized fast neutron detector are not limited to Lucite and ZnS. The plastic cylinders can be fabricated from any material which provides a hydrogen rich source for the proton recoil reaction, which is optically transparent, and which can withstand high temperatures encountered in the borehole environment. The scintillating cylinders can be fabricated from any material which scintillates upon proton bombardment, and which produces scintillations of intensity related to the energy of the bombarding protons.

It should also be noted that the geometrically optimized detector is not limited to a right cylindrical shape. As an example, alternating rectangular layers of plastic and scintillating material can be used to fabricate a detector. FIG. 4b could equally represent a cross sectional view of a rectangular detector.

Figure 4C:
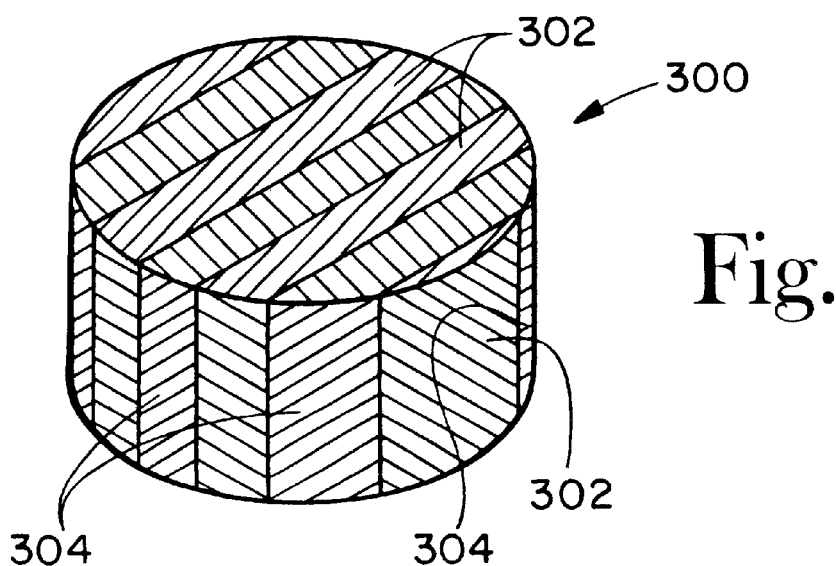
FIG. 4c is a perspective view of an axially layered, geometrically optimized ZnS/plastic fast neutron detector.
Figure 4D:
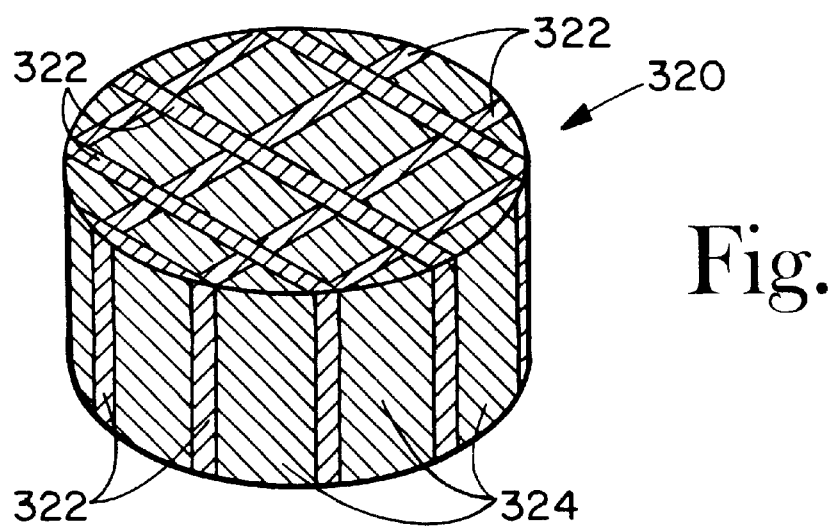
FIG. 4d is a perspective view of an axial bar, geometrically optimized ZnS/plastic fast neutron detector.
Figure 4E:
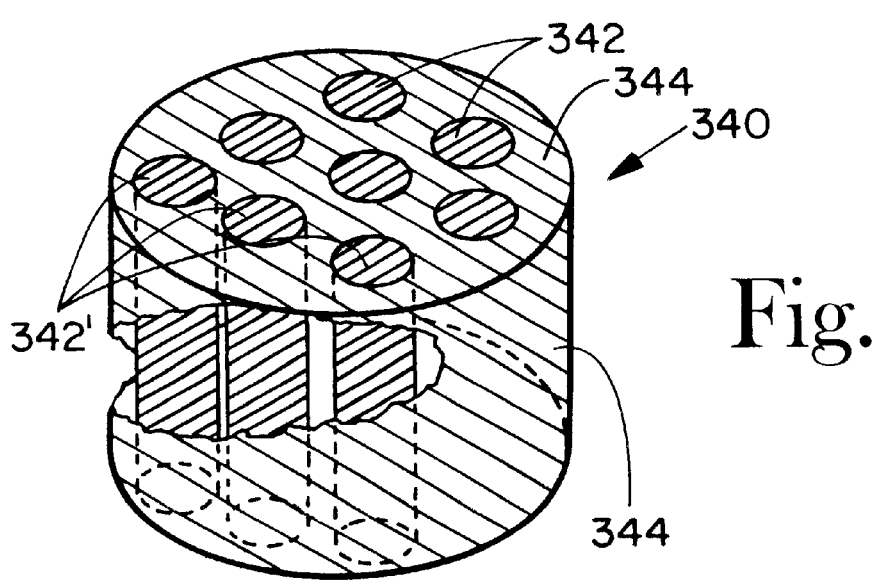
FIG. 4e is a perspective view of an axial rod, geometrically optimized ZnS/plastic fast neutron detector.

Optimization methods previously described for the right, concentric cylindrical detector are also applicable to a rectangular detector, and to other geometric forms forming a right cylinder. FIG. 4c is a perspective view of a layered detector 300 comprising alternating regions of scintillation material 302 and plastic material 304 in the form of panels. FIG. 4d is a perspective view of an axial bar detector 320 comprising a grid of perpendicular layers of scintillation material 322 contacting plastic material 324. FIG. 4e is a perspective view of axial rod detector 340 shown with a cut-away to more fully disclose construction. Cylinders of scintillation material 342 are dispersed axially within a surrounding right axial cylinder of plastic material 344 and, in the example shown, extend from the top to the bottom of the cylinder of plastic material. Conversely, in FIG. 4e the dispersed cylinders 342 could be plastic material and the cylinder 344 the scintillation material. Cylinders 342' are shown in the cut-away portion of the cylinder 344 for purposes of illustration.

Detectors can also be fabricated in conic, triangular, or virtually any shape required for a particular application. The only requirement for operation and optimization set forth in this disclosure are (a) that the detector comprise alternating components of plastic and scintillator material, and (b) that the plastic component provides a path for scintillation light to a PM tube or an alternate device which responds to impinging light.

Logging Application of an Optimized ZnS/Plastic Detector

Figure 5:
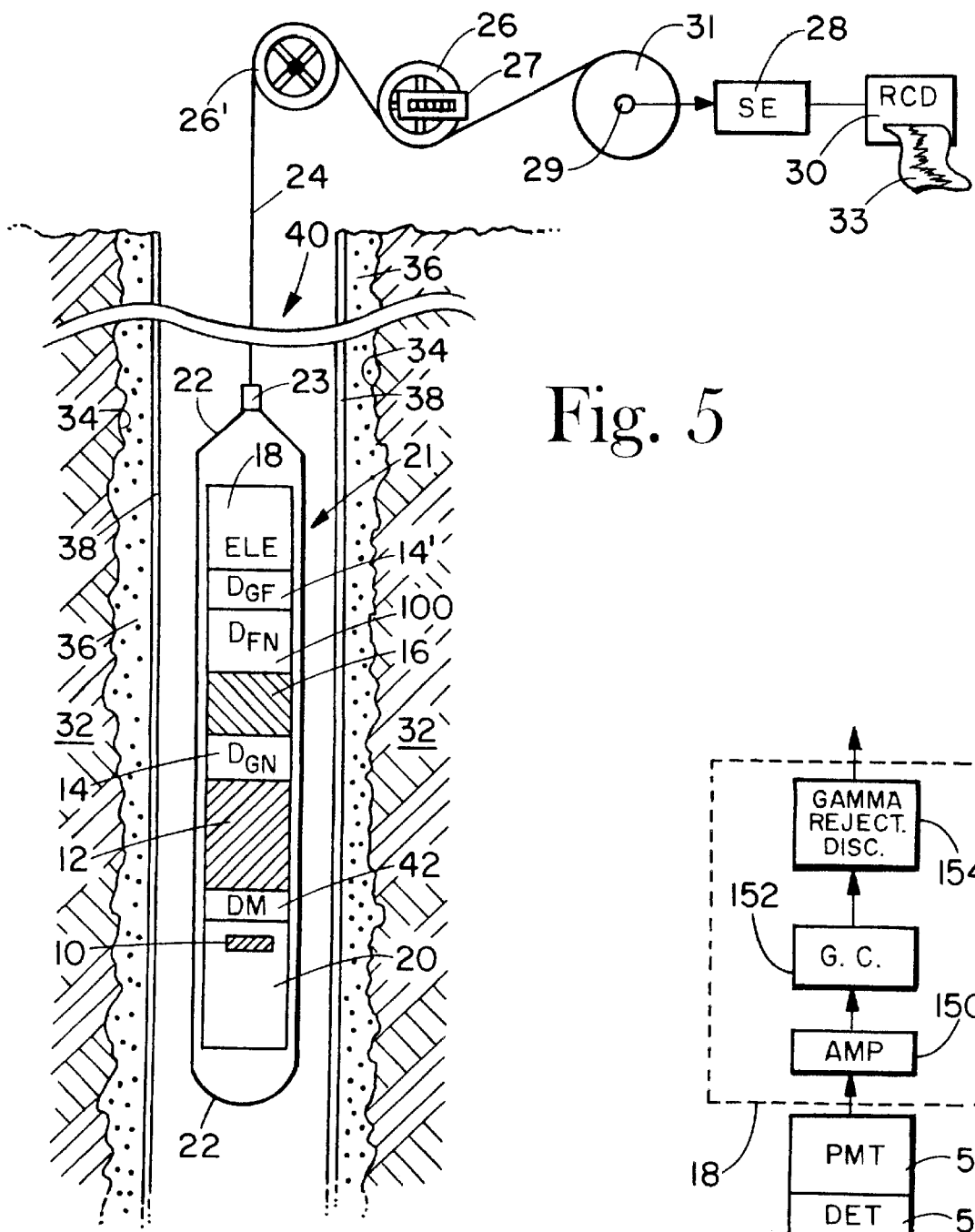
FIG. 5 is an illustration of a geometrically optimized ZnS/plastic fast neutron detector embodied in a nuclear well logging system.

FIG. 5 depicts a logging tool 21 suspended within a borehole 40 by a logging cable 24. The borehole 40 penetrates earth formation 32, and is shown cased with typically steel casing 38. The annulus defined by the outside diameter of the casing 38 and the borehole wall 34 is filled with cement 36. One end of the logging cable 24 is mechanically and electrically connected to the logging tool 21 by means of a cable head 23. The cable 24 then passes over an upper sheave wheel 26' and a calibrated sheave wheel 26 and to a winch reel 31. A depth indicator 27 is attached to the sheave wheel 26 thereby permitting a measurement of the amount of cable deployed in the borehole 24, and therefore the depth of the logging tool 21 in the borehole 40. The depth indicator is electrically connected to a set of surface equipment 28 which is used to control the operation of the logging tool 21 and to process and store data measured by the logging tool. The surface end of the logging cable terminates in a winch 31, and is electrically connected to the surface equipment 28 through electrical slip rings 29. Measurements made by the logging tool 21 are output to a recorder 30 which forms a tabulation of the measurements as a function of depth at which they were measured thereby creating the previously defined "log" 33. It should be understood that the log 33 can be in the form of an analog plot, a digital tabulation, or even a magnetic recording such as a tape or disk.

While FIG. 5 depicts a logging tool, the optimized ZnS detector could likewise be used in a logging-while-drilling tool of the type illustrated in U.S. Pat. No. 5,091,644, and conveyed within the borehole 40 by means of a drill string.

Still referring to FIG. 5, the logging tool 21 comprises a pressure tight housing 22 which contains a neutron generator assembly 20, a "near" axially spaced gamma ray detector 14 and a "far" axially spaced gamma ray detector 14' such as sodium iodide, and a "far" axially spaced, geometrically optimized ZnS/plastic fast neutron detector 100 biased to detect fast neutrons over a range of about 0.5 MeV to 14 MeV. The neutron generator assembly 20 comprises a high energy neutron producing tritiated target 10 with associated deuterium gas reservoir and accelerated ion beam, high voltage supplies and pulsing electronics (not shown). Neutron generators, which produce 14 MeV neutrons by the deuterium-tritium reaction, are well known in the art and are commercially available.

A monitor detector 42 is preferably located close to the neutron target 10 in order to monitor the somewhat variable neutron output produced by this type of generator. The monitor detector is also a geometrically optimized ZnS/plastic fast neutron detector. The monitor detector bias is set to measure neutrons of energy of about 12 MeV or higher in order to more closely monitor the direct fast neutron output from the neutron generator 20 and reject events from neutrons that have been scattered by the surrounding environs. Logging system response can be normalized to a fixed or "standard" neutron output by means of the monitor detector response. The use of the optimized detector as a fast neutron monitor in other applications will be discussed in detail in a subsequent section of this disclosure.

The neutron source is pulsed and is capable of variations in both the pulse repetition rate and the pulse width. The preferred embodiment for a formation porosity/gas saturation logging system employs a pulse repetition rate of 3,000 Hz with a pulse width of about 30 μsec.

Still referring to FIG. 5, a fast neutron and gamma ray shield 12 is placed between neutron generator target 10 and the near gamma detector 14. The shielding material is preferably a material such as steel which will scatter, rather than thermalize, fast neutrons emitted from the target 10 into the formation 32 so that they can interact with formation nuclei thereby providing useful parametric information. The shield 12 also preferably contains an effective gamma ray shielding component to shield the gamma ray detector 14 from gamma radiation induced by the emitted neutron flux in the immediate vicinity of the target 10. The near detector 14 is located as close as possible to the target 10, while allowing for an adequate axial thickness for shield 12. The spacing of the near detector 14 from the target 10 is about 25 cm. The near gamma detector 14 preferably consists of a scintillator coupled to a photomultiplier tube. As stated previously, sodium iodide is an adequate scintillator for the near detector 14, although a scintillator with a faster decay time and made of a material that does not activate by thermal neutrons would be preferred. If sodium iodide is used for near detector 14, then it must be wrapped with a thermal neutron shield such as cadmium to minimize thermal activation within the crystal, and the gamma ray emissions resulting from the activation. In addition, the energy response of the detector is preferably electronically biased to exclude activation produced pulses within the detector crystal.

Again referring to FIG. 5, a fast neutron and gamma shield 16 is placed between near detector 14 and fast neutron detector 100. This shield, like the shield 12, prevents fast neutrons from the neutron generator assembly 20, and neutron induced gamma radiation, from "streaming" directly down the axis of the logging tool 21 and into the detector 100. If sodium iodide is used for far gamma ray detector 14', it must also be shielded with cadmium.

Figure 6:
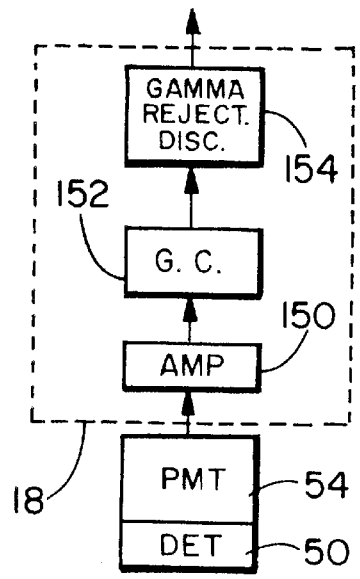
FIG. 6 illustrates amplification, gain control and gamma ray rejection discriminator components of the electronics section of the well logging system.

An electronics package 18 controls and provides power to the various electronic components of the downhole instrument 21. Pulse amplitude counting and biasing circuitry is included within the electronics package 18 providing the previously discussed bias levels for the fast neutron detectors 42 and 100. FIG. 6 illustrates some of the components included in the electronics package 18. Pulses from the PM tube 54 are amplified by an amplification circuit 150. Amplified pulses then pass through a gain control circuit 152, and subsequently through a discriminator 154 in which pulses resulting from gamma radiation impinging upon the detector 50 are rejected.

Attention is next directed toward the analysis of the response of the fast neutron detector 100 to fast neutrons, and the gamma ray detectors 14 and 14' to both prompt and delayed gamma radiation resulting from inelastic scatter and thermal capture reactions, respectively. Detectors 14, 14' and 100 in FIG. 5 are gated so that their pulses are processed and stored during certain time intervals in reference to the beginning of each pulse of neutrons from the neutron generator 20. These time gates are designed to produce detector responses to both prompt and to delayed radiations. The fast neutron detector 100 is gated ON during the neutron burst between times $T_1$ and $T_2$ as illustrated in FIGS. 2a and 2b. The gamma ray detectors are gated ON also during the time interval $T_1$ to $T_2$, during which both prompt gamma radiation and capture gamma radiation are detected. The gamma ray detectors 14 and 14' are subsequently gated ON for two additional time intervals after time $T_2$, which is the termination of the neutron burst. These two additional gamma ray detector gates are used to measure thermal capture radiation, which is subsequently subtracted from the gamma ray count rate measured during the burst leaving only a measure of the desired prompt gamma radiation in the time interval $T_1$ to $T_2$. A more detailed description of this process is found in the previously referenced U.S. Pat. No. 6,207,953.

The porosity (or density) and water or gas saturation of earth formations 32 are determined by combining measures of prompt gamma radiation made with detectors 14 and 14' resulting from fast neutron reactions, and measures of fast neutron radiation made with detector 100. Interpretation charts determined from calibration measurements with the logging system in known formation and borehole conditions, and from computer simulations, are used to infer the formation parameters of interest (porosity and water or gas saturation) from the measured gamma and neutron count rates. These procedures are disclosed in detail in the previously referenced U.S. Pat. No. 6,207,953. The interpretation is influenced by formation matrix composition and by borehole conditions, and will be uncertain to the extent that these other parameters are not known. The effects of a gas filled borehole upon measures of desired parameters of interest can be minimized with a measure fast neutrons at a high energy level and a low energy level. Referring to FIG. 2a, pulses falling within the amplitude range from point 76 to point 77 represent fast neutrons at a low energy level. Pulses falling within the amplitude range from point 77 to 79 represent fast neutrons at a high energy level. Combining the measures of high and low energy fast neutrons yields a borehole correction. Corrections to minimize the effects of variations in liquid and gas filled borehole conditions are disclosed in detail the previously referenced U.S. Pat. No. 6,207,953.

Referring again to FIG. 5, the high energy neutron source 20 repetitively emits pulses or bursts of neutrons at target 10 in relatively short duration of approximately 30 μs, with a repetition rate of about 3,000 pulses per second. The fast neutrons from target 10 react promptly with atomic nuclei in formation 32, principally silicon and oxygen in the case of a silica matrix, or calcium, carbon and oxygen in the case of a limestone matrix. Some of the fast neutrons also scatter from the hydrogen associated with any water present in the formation. Of course, the neutrons also react with nuclei in the tool housing 22 and nearby borehole casing 38, cement 36, and any liquid that might be in the borehole 40. These latter reactions produce undesirable responses in that they yield no information concerning the formation parameters of interest and further interfere with the response of interest from the formation. As discussed previously, detectors 14, 14' and 100 are gated on during the time interval $T_1$, to $T_2$ to detect fast neutrons and prompt gamma rays during the time of the neutron burst. The prompt gamma response contains, as discussed earlier, an unwanted capture component due to the thermalization of fast neutrons and their subsequent capture during the time of the neutron source pulse. Corrections are made to eliminate the thermal capture components.

Again referring to FIG. 5, some of the gamma rays detected promptly during the neutron burst, by detectors 14, 14' and 100, are from inelastic scattering of the fast neutrons from nuclei in formation 32. Some of the fast neutrons detected by fast neutron detector 100 have scattered elastically and inelastically from nuclei in formation 32. The detected neutrons have an energy in the range from 0.5 to 14 MeV. Scattering from the hydrogen contained in the formation 32 has a unique effect on the flux and the energy distribution of fast neutrons in the vicinity of the gamma ray detectors 14 and 14', and fast neutron detector 18. This is due to two properties of hydrogen which are (1) the scattering probability is substantial at the 0.5 MeV minimum detected energy, but decreases rapidly in the detected range from 2 to 14 MeV, and (2) the hydrogen nucleus has nearly the same mass as the neutron so that, unlike any other element, it can acquire most or all the energy from a fast neutron in a single scattering. The fast neutron measurement therefore has a special response to the hydrogen associated with moisture or hydrogen content of the formation surrounding the borehole. For most earth formations, the rock formation does not contain hydrogen, and this special response is associated uniquely with the liquid that fills pore space of the rock matrix. The combined effects of the formation matrix and pore liquid on the fast neutron flux lead to a small dependence on bulk density and a much larger dependence on atom density. For partial or no liquid saturation of the pore space, atom density decreases and there can be a large change in the neutron flux. If the capture gamma ray component is removed from the prompt gamma ray measurement, the resulting inelastic gamma ray responses from detectors 14 and 14' are primarily sensitive to changes in bulk density of the formation, which is also a weak function of the moisture content of the formation. Stated simply, the inelastic gamma and fast neutron responses are both affected by changes in formation density (or porosity) and by changes in formation water (or gas) saturation. However, the two responses depend differently on changes in these formation parameters. Therefore, for a known formation matrix such as silica or limestone, the disclosed logging system can produce values for water (or gas) saturation and porosity (or bulk density) from the combined measures fast neutron and inelastic gamma responses by use of a two-dimensional transform grid determined from calibration data with known physical models and from computer simulations. A given transform grid is appropriate only for a particular rock matrix and set of borehole conditions. This transform is discussed in more detail in previously referenced U.S. Pat. No. 6,207,953.

The logging system utilizing the geometrically optimized fast neutron detector 100 can be effectively operated in cased and open boreholes, and in gas filled and liquid filled boreholes. This does not, however, imply that the measurements are independent of borehole conditions. The effects of borehole conditions on the measurements can, however, be determined and the measurements can be compensated or corrected for these borehole conditions as discussed in detail in the previously referenced U.S. Pat. No. 6,207,953. The transform grids disclosed U.S. Pat. No. 6,207,953 produce the desired formation parameters of porosity (or bulk density) and gas saturation (or water saturation) when the system logs a liquid filled borehole and measures fast neutron counts versus depth, and inelastic gamma ray counts versus depth, and when the formation mineral (matrix) and borehole conditions conform to those assumed for the nominal transform grid. Stated another way, one transform grid represents the response of the logging system for one set of borehole conditions and for one formation lithology. For gas filled boreholes, a transform grid representing one borehole condition can be used to process data measured under different boreholes by combining high energy and low energy fast neutron measurements as previously discussed.

The use of the optimized fast neutron detector in a specific wireline logging tool has been disclosed in detail above. It should be understood, however, that the optimized fast neutron detector can be used in any wireline, measurement-while-drilling, or any other type of logging tool requiring a measurement of fast neutron flux.

Application of an Optimized Plastic Detector as a Fast Neutron Monitor

As discussed previously, the disclosed logging system requires a measure of neutron generator output in order to obtain accurate measures of parameters of interest. Many non-logging analysis and testing systems also use sources of fast neutrons. These systems include activation analysis systems, mineral assay systems, industrial waste monitoring systems and the like. Two of these systems will be discussed briefly as background information in the disclosure of the geometrically optimized detector embodied in a fast neutron monitoring system.

Fast neutron activation analysis was developed in the late 1950s. Samples of material are irradiated with fast neutrons for a predetermined length of time. Fast neutrons interact with elements within the system to form radioactive isotopes. These isotopes subsequently emit delayed gamma radiation of characteristic energy. With proper calibration of the system, and with proper control of variable parameters such as irradiation time, sample geometry, detector efficiency and the like, the measured intensity of the characteristic gamma radiation can be related to a concentration of the element of interest within the sample. Characteristic gamma ray intensity can also vary as a function of the output of the fast neutron source. Neutron output must, therefore, be accurately monitored in order to obtain desired parameters of interest.

A method for analyzing the grade of coal was introduced in the 1970s, wherein coal is irradiated with 14 MeV neutrons, and induced prompt gamma radiation is measured to determine carbon and oxygen content of the coal. A measure of these elemental concentrations is then related to the quality or "grade" of coal. The intensity of measured gamma radiation is used to determine element content. Intensity of measured gamma radiation can, however, also vary with variations in the output of the neutron generator. An accurate monitor of fast neutron output from the source is, therefore, required to obtain accurate measures of coal grade.

Fast neutron sources, operated in an environ other than a vacuum, produces a wide variety of other types of radiations. These radiations are induced by the fast neutrons interacting with virtually any material surrounding the fast neutron source. Epithermal and thermal neutrons are generated by the interaction of fast neutrons with any material in the vicinity of the source. Prompt gamma radiation is generated by the inelastic scatter of fast neutrons with material in the surrounding environs. Thermal capture gamma radiation is induced by the capture of thermalized neutrons by elements in the surrounding environs. Previously discussed activation gamma radiation is generated by interaction of fast, epithermal and thermal neutrons with elements within materials surrounding the fast neutron source. Any fast neutron monitor detector must, therefore, be insensitive to the varying and often intense "secondary" radiations generated by the neutron source, and respond only to fast neutrons emitted by the source. If the surrounding environs contains a high concentration of light elements, fast neutrons cease to be "fast" after the first interaction with such nuclei. This is particularly true in wellbore environments where the hydrogen concentration per unit volume is often relatively high.

Prior art fast neutron monitor systems are relatively numerous and well known. Stated generically, the systems are typically based upon pulse shape discrimination, gamma ray shielding, detector timing, and combinations of thereof. All suffer from the inability to discriminate the effects of induced gamma radiation and the inability to discriminate the effects of neutrons which have undergone some type of scatter reaction, but still posses relatively high energies in the MeV range. The geometrically optimized fast neutron detector minimized these problems found in prior art systems.

Figure 8:
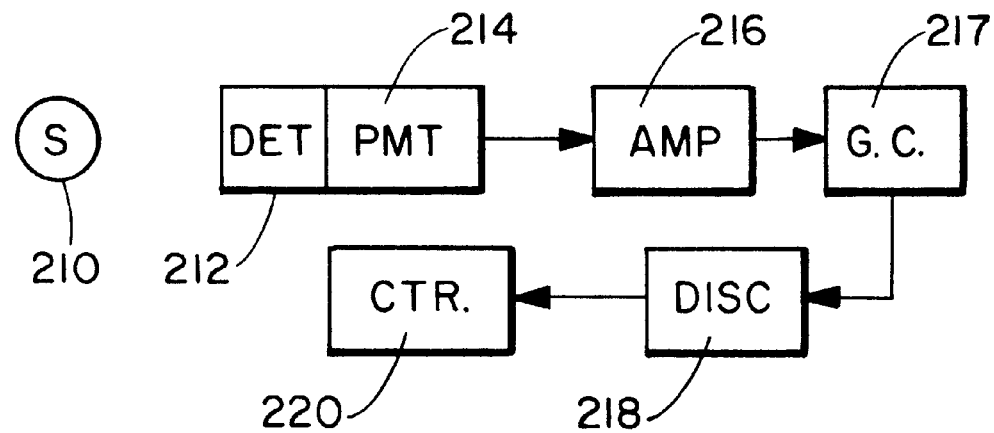
FIG. 8 is a functional diagram of a fast neutron monitoring system using the geometrically optimized detector.

FIG. 8 is a functional diagram illustrating a fast neutron source 210 such as a 14 MeV neutron generator. A geometrically optimized detector 212, optically coupled to preferably a PM tube 214, is placed in close proximity to the source 210. Pulses from the source are amplified with an amplifier circuit 216, and the gain of the system is stabilized with a gain control circuit 217. Pulses from the gain control circuit pass through a discriminator 218 where all "events" which have undergone any type of reaction with nuclei in the surrounding environs are rejected. The output of the discriminator circuit 218 to a counter 220 is, therefore, directly related to the output of the fast neutron source 220.

Since the detector 210 is placed within close proximity of the fast neutron source 210, the neutron flux impinging upon the detector is typically quite intense. Maximization of detector total efficiency is usually not necessary. The detector is, therefore, geometrically optimized for spectroscopy efficiency as stated mathematically in equation (2), rather than for total efficiency as stated mathematically in equation (1). With the detector 212 optimized for spectral precision, the discriminator can be set relatively high. For purposes of discussion, assume that the fast neutron source is a deuterium-tritium neutron generator that produces neutrons at a nominal 14 MeV level. Neutron output is typically not truly monoenergetic, and the output energy is typically an angular distribution centered at approximately 14 MeV. Furthermore, single scatter events usually decrease the neutron energy well below approximately 12 MeV. Considering these two mechanisms, a detector bias set at approximately 12 MeV essentially records unperturbed fast neutron output. Prior art systems do not have the gamma ray rejection features, and the ability to be spectrally optimized to allow a meaningful bias level to be set with accuracy and precision at approximately 12 MeV.

Other Applications

Figure 7:
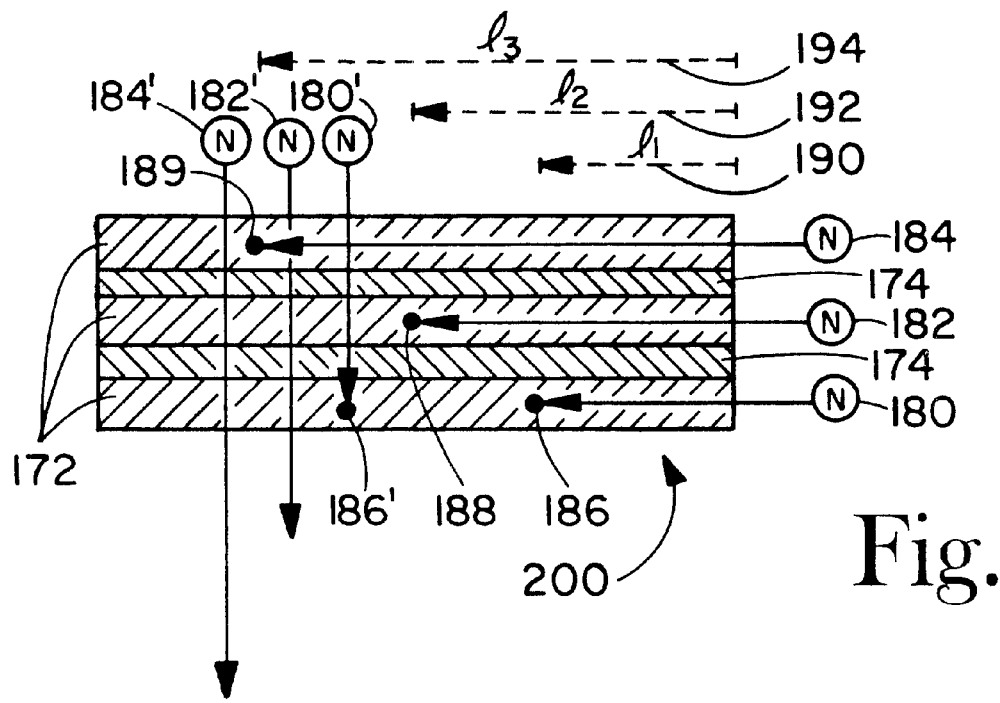
FIG. 7 is a conceptual illustration of directional detector sensitivity of the geometrically optimized detector.

The geometrically optimized fast neutron detector can be fabricated to exhibit directional neutron detection characteristics. FIG. 7 is a highly conceptualized illustration of possible directional detection bias properties of the geometrically optimized detector. The detector 200 is shown in sectional view, and can be either cylindrical or rectangular Alternating layers of plastic 172 and scintillating material 174 are shown. Assume that a neutron 180 impinges upon the detector from the right, travels a distance $l_1$ identified as 190 within plastic material 172, and interacts at a point 186 to form a recoil proton. Assume that a second neutron 182 impinges upon the detector from the right, travels a distance $l_2$ identified as 192 within plastic material 172, and interacts at a point 188 to form a recoil proton. Finally, assume that a third neutron 184 impinges upon the detector from the right, travels a distance $l_3$ identified as 194 within plastic material 172, and interacts at a point 189 to form a recoil proton. There is a high statistical probability that all three recoil protons will enter scintillating material 174, create scintillations, and these scintillations will be sensed by an affixed PM tube (not shown). It should be noted that detection probability is relatively high only if the proton is produced close to the interface with the scintillator material. Stated simply, the three neutrons 180, 182 and 184 impinging upon the detector from the right will probably be "detected". Next consider the same three neutrons, now denoted by 180', 182' and 184', impinging upon the detector from the top. Assuming for simplicity that the fast neutron attenuating properties of plastic and scintillation material are the same, the neutron 180' will (statistically) travel the distance $l_1$ and interact at a point 186' to form a recoil proton. Again, there is a high statistical probability that neutron 180' will be detected. If, however, neutrons 182' and 184' travel the same statistical path lengths $l_2$ and $l_3$, they will pass through the detector undetected. In summary, there is a high statistical probability that three neutrons entering the detector from the right will be detected. Conversely, there is a high statistical probability that only one of the three neutrons will be detected when impinging upon the detector from the top. This is because proton production is "directional", and scintillation photon production is proportional to proton production. The efficiency of the detector fabricated and oriented as shown in FIG. 7 is, therefore, highly biased in the horizontal direction.

Although the geometrically optimized fast neutron detector was conceived for use in boreholes to log parameters such as density (porosity) and gas (water) content in subsurface geologic formations, the detector has other applications in apparatus to analyze other materials. As an example the ZnS/plastic fast neutron detector can be used to analyze highway roadbeds prior to paving the surface. It is very important to establish that this substrate material is of the proper bulk density and moisture content before the paving process begins. The existing nuclear gamma density and neutron moisture gauges used for this purpose are losing favor with the industry because of the required isotopic radioactive sources and their related licensing and safety difficulties. Apparatus of the present invention comprising a geometrically optimized ZnS/plastic fast neutron detector, a prompt gamma ray detector, and a pulsed neutron source which can safely be deactivated represents a desirable replacement for existing density and neutron gauges for the highway surface applications. Similar applications may exist in industrial process control where material density and/or moisture content must be monitored during manufacture of products.

While the foregoing disclosure is directed to the preferred embodiments of the present invention, other and further embodiments of the invention may be devised without departing from the basic scope thereof, and the scope thereof is determined by the claims which follow.

What is claimed is:

1. A logging tool for measuring a property of material penetrated by a borehole, comprising:
   (a) a nuclear radiation detector comprising alternating components of scintillating material and non scintillating, hydrogenous, optically transparent material, wherein said components are fabricated to optimize detector response;
   (b) means cooperative with said detector to generate a signal indicative of radiation impinging upon said detector; and
   (c) means for transforming said signal into a measure of said property; wherein
   (d) geometric configuration and dimensions of said components are selected to optimize detector spectroscopy efficiency response.

2. The logging tool of claim 1 wherein said components comprise:
   (a) a plurality of axially parallel cylinders distributed within a bounding axially parallel cylinder; and (b) said scintillating material alternates with said non scintillating, hydrogenous, optically transparent material at each interface of said components.

3. The logging tool of claim 1 wherein said scintillating material is ZnS.

4. The logging tool of claim 1 wherein said non scintillating, hydrogenous, optically transparent material is plastic.

5. The logging tool of claim 1 wherein said logging tool is conveyed along said borehole by means of a wireline.

6. The logging tool of claim 1 wherein said logging tool is conveyed along said borehole by means of a drill string.

7. The logging tool of claim 1 further comprising a fast neutron source.

8. The logging tool of claim 1 wherein said property comprises gas saturation.

9. The logging tool of claim 1 wherein said property comprises porosity.

10. The logging tool of claim 1 wherein said property comprises bulk density.

11. A method for measuring at least one parameter of material in an environs of a borehole penetrating earth formation, the method comprising:
    (a) irradiating said material with pulses of high energy neutrons produced by a neutron generator;
    (b) measuring fast neutrons resulting from interaction of said high energy neutrons with said material using a geometrically optimized ZnS/plastic fast neutron detector;
    (c) using said measure of fast neutrons in determining said parameter of said material;
    (d) measuring prompt gamma radiation resulting from inelastic scatter of said high energy neutrons within said material and combining with said measure of fast neutrons in determining said parameter of said material;
    (e) providing a first axially spaced gamma ray detector within said borehole at a first spacing from said neutron generator and providing a second axially spaced gamma ray detector at a second spacing from said neutron generator;
    (f) measuring said prompt gamma radiation at said first and said second spacings with said gamma ray detectors;
    (g) axially spacing within said borehole said geometrically optimized ZnS/plastic fast neutron detector at a third spacing from said neutron source; and
    (h) measuring said fast neutrons at said third spacing with said geometrically optimized ZnS/plastic fast neutron detector; wherein;
        (i) said gamma ray measurements and said fast neutron measurements at a high energy level and a low energy level are made during said neutron pulses.

12. The method of claim 11 comprising the additional step of measuring during said neutron pulses prompt gamma radiation resulting from inelastic scatter of said high energy neutrons within said material and combining with said measure of fast neutrons to determine said parameter of said material.

13. The method of claim 11 wherein said second spacing and said third spacing are greater than said first spacing.

14. The method of claim 11 further comprising the step of combining said fast neutron high energy measurement and said fast neutron low energy measurement to minimize effects of said borehole upon said determination of said parameter of said earth formation.

15. The method of claim 11 wherein said at least one parameter comprises gas saturation.

16. The method of claim 11 wherein said at least one parameter comprises porosity.

17. The method of claim 11 wherein said at least one parameter comprises bulk density.

18. The method of claim 11 comprising the additional step of energy discriminating a response of said geometrically optimized ZnS/plastic fast neutron detector so that said detector responds only to fast neutrons impinging thereon.

19. A method for measuring a property of material penetrated by a borehole, comprising:
    (a) placing a nuclear radiation detector within said material, wherein
        (i) said detector comprises alternating components of scintillating material and non scintillating, hydrogenous, optically transparent material, and
        (ii) said components are dimensioned to optimize detector efficiency;
    (b) providing means cooperative with said detector to generate a signal indicative of radiation impinging upon said detector;
    (c) providing means for transforming said signal into a measure of said property; and
    (d) selecting geometric configuration and dimensions of said components to optimize spectroscopy efficiency of the detector for a specified detector diameter.

20. The method of claim 19 wherein said components comprise:
    (a) a plurality of axially parallel cylinders distributed within a bounding axially parallel cylinder thereby forming interfaces; and
    (b) said scintillating material alternates with said non scintillating, hydrogeneous, optically transparent material at each said interfaces.

21. The method of claim 19 wherein said scintillating material is ZnS.

22. The method of claim 19 wherein said non scintillating, hydrogenous, optically transparent material is plastic.

23. The method of claim 19 further comprising:
    (a) mounting said detector within a pressure housing; and
    (b) generating said signal from an output of said detector which is indicative of a low energy level and a high energy level of radiation impinging upon said detector and thereby indicative of said property.

24. The method of claim 19 comprising the additional step of conveying said detector along said borehole by means of a wireline.

25. The method of claim 19 comprising the additional step of conveying said detector along said borehole by means of a drill string.

* * * * *